US009643661B2

(12) United States Patent
Kosaka (10) Patent No.: US 9,643,661 B2
(45) Date of Patent: May 9, 2017

(54) PANEL JOINT STRUCTURE (71) Applicant: TOYOTA JIDOSHA KABUSHIKI KAISHA, Toyota-shi, Aichi-ken (JP)

(72) Inventor: Naoya Kosaka, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/855,093

(22) Filed: Sep. 15, 2015

(65) Prior Publication Data
US 2016/0083021 A1 Mar. 24, 2016

(30) Foreign Application Priority Data

Sep. 24, 2014 (JP) .................................. 2014-193691

(51) Int. Cl.
*B62D 25/24* (2006.01)
*B62D 25/02* (2006.01)
*B62D 25/08* (2006.01)
*B62D 27/02* (2006.01)

(52) U.S. Cl.
CPC ............ *B62D 25/24* (2013.01); *B62D 25/02* (2013.01); *B62D 25/082* (2013.01); *B62D 27/02* (2013.01)

(58) Field of Classification Search
CPC .... B62D 21/152; B62D 25/02; B62D 25/082; B62D 21/02; B62D 21/157; B62D 25/025; B62D 25/04; B60J 5/0437; B60J 5/0443; B60J 1/17; B60J 5/0427; B60J 5/042; B60R 19/18; B60R 19/24; B60R 2019/1806;

(Continued)

(56) References Cited

U.S. PATENT DOCUMENTS 5,433,501 A * 7/1995 Thomas ................. B62D 33/04
105/409
6,200,651 B1 * 3/2001 Roche ................... C23C 16/401
427/571

(Continued)

FOREIGN PATENT DOCUMENTS

JP S56-64875 U 5/1981
JP 2010-227981 A 10/2010

(Continued)

OTHER PUBLICATIONS

Oct. 4, 2016 Office Action issued in Japanese Patent Application No. 2014-193691.

*Primary Examiner* — Glenn Dayoan
*Assistant Examiner* — Sunsurraye Westbrook
(74) *Attorney, Agent, or Firm* — Oliff PLC (57) ABSTRACT A panel joint structure including: a first panel; a second panel that forms a space between itself and the first panel; a joint portion; a seal member that seals a gap between a distal end portion of the joint flange portion and the second panel; and a first panel bead portion that is formed in a region of the joint flange portion adjacent to the joint portion in the lengthwise direction of the first panel, that projects in a direction away from the second panel, that extends from a distal end to a base end of the joint flange portion, that forms with the second panel an air vent hole communicated with the space, and that slopes in a direction away from the second panel heading toward the base end side of the joint flange portion as seen from the lengthwise direction of the first panel.

5 Claims, 4 Drawing Sheets (58) Field of Classification Search
CPC ......... B60R 19/04; B60R 19/12; B60R 19/48; B60R 2019/1813
USPC ... 296/187.09, 146.6, 203.02, 193.09, 146.2, 296/187.11, 191, 209; 180/274; 293/102, 117, 133, 154, 155
See application file for complete search history.

(56) References Cited

U.S. PATENT DOCUMENTS

| | | | |
|---|---|---|---|
| 7,316,444 B2 * | 1/2008 | Montagna | B29C 66/7392 156/210 |
| 7,740,306 B2 * | 6/2010 | Ochoa | B62D 33/04 296/186.1 |

FOREIGN PATENT DOCUMENTS

| | | |
|---|---|---|
| JP | 2012-206704 A | 10/2012 |
| JP | 2013136076 A | 7/2013 |

* cited by examiner

FIG.4C

PANEL JOINT STRUCTURE

CROSS-REFERENCE TO RELATED APPLICATION

This application is based on and claims priority under 35 USC 119 from Japanese Patent Application No. 2014-193691 filed on Sep. 24, 2014, the disclosure of which is incorporated by reference herein.

BACKGROUND

Technical Field

The present invention relates to a panel joint structure.

Related Art

Japanese Patent Application Laid-open (JP-A) No. 2013-136076 discloses a panel joint structure wherein a pair of panels each have a flange and the flanges are joined to one another. Furthermore, a cross-sectionally substantially semi-circular shaped bead is formed in each of the pair of flanges, and an air passageway (air vent hole) is formed by the pair of beads. Because of this, when the pair of panels are electrodeposition coated in a state in which the panels have been joined to one another, air between the pair of panels can be vented from the air passageway.

Furthermore, after the electrodeposition coating of the panels, usually a seal member is applied to distal end portions of the flanges to thereby seal the gap between the distal end portions of the flanges in order prevent the inside of the pair of panels from becoming wet with water.

In the panel joint structure described above, in order to enhance the air venting effect resulting from the air passageway, it is effective to enlarge the cross-sectional area of the air passageway. To achieve this, the cross-sectional area of the air passageway can be enlarged by enlarging the height dimension of the beads, for example. However, in this case, the distance between the pair of beads increases, so the air passageway can no longer be sealed by the seal member at the distal end portions of the pair of beads.

The cross-sectional area of the air passageway can also be enlarged by enlarging the width dimension of the beads, for example. However, in this case, the length of the joint portion at which the pair of panels are joined to one another becomes shorter. For this reason, there is the concern that the joint strength between the pair of panels will become lower. Thus, it is desired to make the panel joint structure into a structure that can ensure sealedness and joint strength between the pair of panels and can enhance the air venting effect resulting from the air passageway.

SUMMARY

In view of the circumstances described above, it is an object of the present invention to provide a panel joint structure that can ensure sealedness and joint strength between a first panel and a second panel and can enhance the air venting effect resulting from an air vent hole.

A first aspect of the present invention provides a panel joint structure including:

a first panel that is formed in an elongated shape and has a joint flange portion formed at one end portion or both end portions as seen from a lengthwise direction;

a second panel that is disposed opposing the joint flange portion in a thickness direction of the joint flange portion, that is joined to the joint flange portion, and that forms a space between itself and the first panel;

a joint portion that configures the section of the joint flange portion joined to the second panel and that is formed along a lengthwise direction of the first panel;

a seal member that seals a gap between a distal end portion of the joint flange portion and the second panel; and a first panel bead portion that is formed in a region of the joint flange portion adjacent to the joint portion in the lengthwise direction of the first panel, that projects in a direction away from the second panel, that extends from a distal end to a base end of the joint flange portion, that forms with the second panel an air vent hole communicated with the space, and that slopes in a direction away from the second panel heading toward the base end side of the joint flange portion as seen from the lengthwise direction of the first panel.

In the panel joint structure of the first aspect of the present invention, the first panel is formed in an elongated shape. The joint flange portion is formed on one end portion or both end portions of the first panel as seen from the lengthwise direction of the first panel. Furthermore, the second panel is disposed opposing the first panel in the plate thickness direction of the joint flange portion, and the second panel is joined to the joint flange portion. Additionally, the section of the joint flange portion joined to the second panel is a joint portion, and the joint portion is formed in the lengthwise direction of the first panel. Moreover, a space is formed between the first panel and the second panel, and the gap between the distal end portion of the joint flange portion and the second panel is sealed by the seal member.

Furthermore, the first panel bead portion is formed in the joint flange portion in a region adjacent to the joint portion in the lengthwise direction of the first panel. Additionally, the first panel bead portion projects in a direction away from the second panel and extends from the distal end to the base end of the joint flange portion. Because of this, the air vent hole is formed by the first panel bead portion and the second panel, and the air vent hole is communicated with the space between the first panel and the second panel. For this reason, before the gap between the distal end portion of the joint flange portion and the second panel is sealed by the seal member, when electrodeposition coating the first panel and the second panel in a state in which they have been joined to one another, the air inside the space between the first panel and the second panel can be vented from the air vent hole.

Here, the first panel bead portion slopes in a direction away from the second panel heading toward the base end side of the joint flange portion as seen from the lengthwise direction of the first panel. Because of this, the distance between the first panel bead portion and the second panel at the distal end of the first panel bead portion can be kept from increasing. For this reason, the gap between the second panel and the distal end portion of the joint flange portion including the first panel bead portion can be excellently sealed by the seal member. At the base end of the first panel bead portion, the distance between the first panel bead portion and the second panel can be lengthened compared to at the distal end of the first panel bead portion. For this reason, the width dimension of the first panel bead portion can be kept from becoming larger and the cross-sectional area of the air vent hole can be enlarged at the base end side of the first panel bead portion. Because of this, the joint length of the joint portion can be kept from becoming shorter and the air inside the space between the first panel and the second panel can be excellently caused to flow into the air vent hole. Consequently, the joint strength at the joint portion can be ensured and the air venting effect resulting from the air vent hole during electrodeposition coating can be enhanced.

A second aspect of the present invention provides a panel joint structure including:

a first panel that is formed in an elongated shape and has a joint flange portion formed at one end portion or both end portions as seen from a lengthwise direction;

a second panel that is disposed opposing the joint flange portion in a thickness direction of the joint flange portion, that is joined to the joint flange portion, and that forms a space between itself and the first panel;

a joint portion that configures the section of the joint flange portion joined to the second panel and that is formed along a lengthwise direction of the first panel;

a seal member that seals a gap between a distal end portion of the joint flange portion and the second panel; and a first panel bead portion that is formed in a region of the joint flange portion adjacent to the joint portion in the lengthwise direction of the first panel, that projects in a direction away from the second panel, that extends from a distal end to a base end of the joint flange portion, that forms with the second panel an air vent hole communicated with the space, and whose width dimension as seen from the thickness direction of the joint flange portion is set so as to be larger at the distal end of the joint flange portion than at the base end of the joint flange portion.

In the panel joint structure of the second aspect of the present invention, the width dimension of the first panel bead portion as seen from the plate thickness direction of the joint flange portion is set so as to be larger at the distal end of the joint flange portion than at the base end of the joint flange portion. For this reason, the distance between the first panel bead portion and the second panel at the distal end of the first panel bead portion can be set to a distance that can be sealed by the seal member and the cross-sectional area of the air vent hole can be enlarged. Because of this, by setting the joint portion on the base end side of the joint flange portion, sealedness and joint strength between the first panel and the second panel can be ensured and the air venting effect resulting from the air vent hole can be enhanced.

A third aspect of the present invention provides the panel joint structure of the second aspect, wherein the first panel bead portion slopes in a direction away from the second panel heading toward the base end side of the joint flange portion as seen from the lengthwise direction of the first panel.

In the panel joint structure of the third aspect of the present invention, the cross-sectional area of the air vent hole can be set large at the distal end and the base end of the first panel bead portion. Because of this, the air venting effect resulting from the air vent hole when electrodeposition coating the first panel and the second panel can be enhanced even more.

A fourth aspect of the present invention provides the panel joint structure of any one of the first through third aspects, wherein:

the first panel bead portion includes a pair of side wall portions, that configure both width direction end portions of the first panel bead portion, and a bottom wall portion that couples the pair of side wall portions to one another, and the bottom wall portion is disposed parallel to the second panel as seen in a cross-sectional view seen from the distal end side of the joint flange portion.

In the panel joint structure of the fourth aspect of the present invention, the distance between the bottom wall portion of the first panel bead portion and the second panel as seen in a cross-sectional view seen from the distal end side of the joint flange portion can be set constant. Because of this, the seal member can be excellently disposed between the bottom wall portion of the first panel bead portion and the second panel at the distal end portion of the first panel bead portion.

A fifth aspect of the present invention provides the panel joint structure of any one of the first through third aspects, wherein the first panel bead portion is curved in such a way as to become convex in a direction away from the second panel as seen in a cross-sectional view seen from the distal end side of the joint flange portion.

In the panel joint structure of the fifth aspect of the present invention, the first panel bead portion can be given a shape that is easy to form. Because of this, the formability of the first panel can be improved.

A sixth aspect of the present invention provides the panel joint structure of any one of the first through fifth aspects, wherein:

a joint counterpart flange portion, that is disposed opposing the joint flange portion and that is joined to the joint flange portion, is formed in the second panel, a second panel bead portion that projects in a direction away from the first panel is formed in the joint counterpart flange portion, and the air vent hole is formed by the first panel bead portion and the second panel bead portion.

In the panel joint structure of the sixth aspect of the present invention, the joint counterpart flange portion is formed in the second panel, and the joint counterpart flange portion is disposed opposing the joint flange portion of the first panel and is joined to the joint flange portion. Furthermore, the second panel bead portion is formed in the joint counterpart flange portion, and the second panel bead portion projects in a direction away from the first panel. Additionally, the air vent hole is formed by the first panel bead portion and the second panel bead portion. For this reason, the width dimension of the first panel bead portion (the air vent hole) can be set smaller compared to a case where the second panel bead portion is not disposed in the second panel. Because of this, the joint length at the joint portion can be lengthened. Consequently, the joint strength at the joint portion can be enhanced.

A seventh aspect of the present invention provides the panel joint structure of any one of the first through sixth aspects, wherein:

the first panel is a skeletal member that extends in a front and rear direction or a vehicle width direction of a vehicle, and the second panel is a member that configures a lower portion of the vehicle.

In the panel joint structure of the seventh aspect of the present invention, the panel joint structure of the present invention can be applied to the lower portion of a vehicle. Because of this, electrodeposition coating can be excellently performed with respect to members that configure the lower portion of a vehicle, which easily becomes wet with liquid such as water.

According to the panel joint structures of the first aspect to the third aspect of the present invention, sealedness and joint strength between the first panel and the second panel can be ensured and the air venting effect resulting from the air vent hole can be enhanced.

According to the panel joint structure of the fourth aspect of the present invention, workability when disposing the seal member on the distal end portion of the first panel bead portion can be improved.

According to the panel joint structure of the fifth aspect of the present invention, the formability of the first panel can be improved.

According to the panel joint structure of the sixth aspect of the present invention, the joint strength at the joint portion can be enhanced.

According to the panel joint structure of the seventh aspect of the present invention, electrodeposition coating can be excellently performed with respect to members that configure the lower portion of a vehicle.

BRIEF DESCRIPTION OF THE DRAWINGS

An exemplary embodiment of the present invention will be described in detail based on the following figures, wherein.

DETAILED DESCRIPTION

Figure 1:
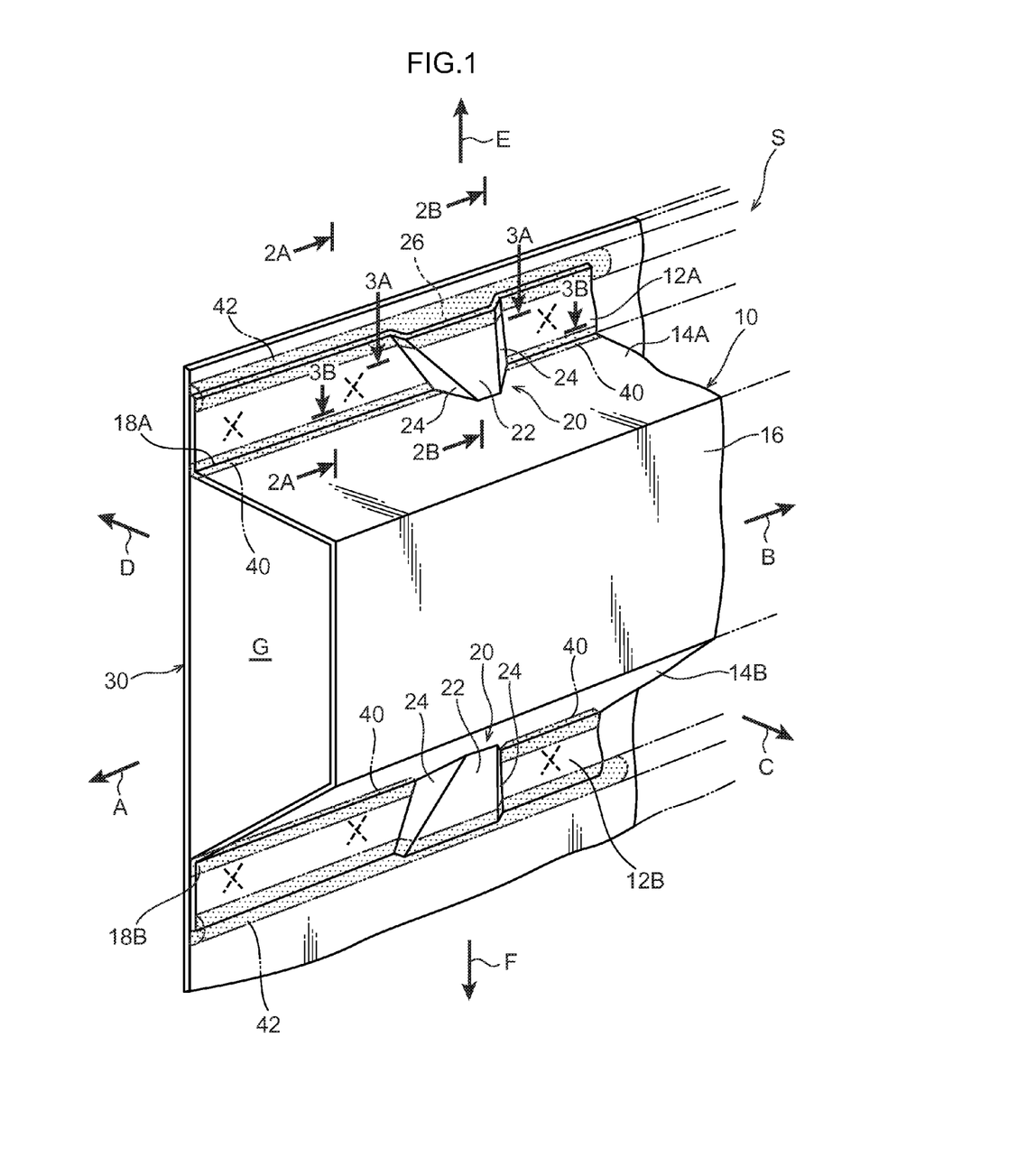
FIG. 1 is a schematic perspective view showing a joint state of a first panel and a second panel to which a panel joint structure pertaining to the embodiment has been applied.

A panel joint structure S pertaining to an embodiment of the present invention will be described below using the drawings. As shown in FIG. 1, the panel joint structure S is applied to joint sections between a first panel 10 and a second panel 30. Additionally, the first panel 10 and the second panel 30 are members that configure the lower portion of a vehicle (automobile). That is, the first panel 10 is, for example, a skeletal member such as a cross member whose lengthwise direction coincides with the vehicle width direction of the vehicle or a side member whose lengthwise direction coincides with the front and rear direction of the vehicle, and the second panel 30 is, for example, a floor panel that configures the floor of the vehicle. These will be specifically described below.

The first panel 10 is configured by a steel plate and is formed in a substantially elongated shape along the direction of arrow A and the direction of arrow B in FIG. 1. Furthermore, the first panel 10 is formed in a cross-sectionally substantially hat shape as seen from one side in the lengthwise direction of the first panel 10 (the side in the direction of arrow A in FIG. 1). Specifically, the first panel 10 is configured to include a pair of joint flange portions 12A and 12B that configure both end portions of the first panel 10 as seen from the lengthwise direction, a pair of panel side wall portions 14A and 14B that extend from base ends of the joint flange portions 12A and 12B toward one side in the plate thickness direction of the joint flange portions 12A and 12B (the side in the direction of arrow C in FIG. 1), and a panel bottom wall portion 16 that couples distal ends of the pair of panel side wall portions 14A and 14B to one another and is disposed substantially parallel to the joint flange portions 12A and 12B. Additionally, in the following description, the direction (the direction of arrow E and the direction of arrow F in FIG. 1) orthogonal to the lengthwise direction of the first panel 10 as seen from the plate thickness direction of the joint flange portions 12A and 12B will be called an orthogonal direction, and the width direction of the first panel 10 (panel width direction) coincides with the orthogonal direction. Therefore, the joint flange portions 12A and 12B are formed on both end portions of the first panel 10 in the panel width direction.

The second panel 30 is configured by a steel plate and has a substantially flat plate shape. Furthermore, the second panel 30 is disposed on the other side in the plate thickness direction of the joint flange portions 12A and 12B (the side in the direction of arrow D in FIG. 1) and is disposed opposing the first panel 10 in the plate thickness direction of the joint flange portions 12A and 12B. Additionally, the second panel 30 is joined to the joint flange portions 12A and 12B of the first panel 10. Specifically, an adhesive 40 is interposed, in the lengthwise direction of the first panel, in the sections between the base end portions of the joint flange portions 12A and 12B and the second panel 30 excluding later-described air vent beads 20, and in this state the base end portions of the joint flange portions 12A and 12B and the second panel 30 are continuously joined to one another in the lengthwise direction of the first panel 10 by laser welding.

Figure 2A:
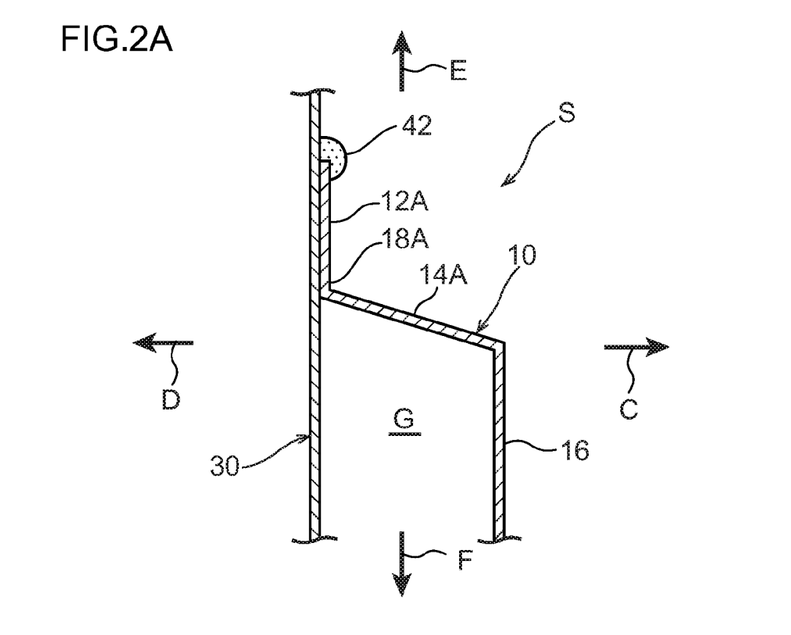
FIG. 2A is an enlarged cross-sectional view (a cross-sectional view along line 2A-2A of FIG. 1) showing a joint flange portion shown in FIG. 1 as seen from one side in a lengthwise direction of the first panel.

Because of this, a closed cross-sectional structure is formed by the first panel 10 and the second panel 30, and a space G is formed between the first panel 10 and the second panel 30. Additionally, the sections of the joint flange portions 12A and 12B of the first panel 10 joined to the second panel 30 are joint portions 18A and 18B, and the joint portions 18A and 18B are formed along the lengthwise direction of the first panel 10 and are disposed next to one another in the lengthwise direction of the first panel 10. Furthermore, as shown also in FIG. 2A, a sealer 42 serving as a "seal member" is applied along the lengthwise direction of the first panel 10 to distal end portions of the joint flange portions 12A and 12B, so that the gaps between the distal end portions of the joint flange portions 12A and 12B and the second panel 30 are sealed by the sealer 42.

Next, an air vent bead 20 serving as a "first panel bead portion" that is the main part of the present invention will be described. As shown in FIG. 1, the air vent bead 20 is formed in each of the pair of joint flange portions 12A and 12B of the first panel 10. Additionally, the air vent bead 20 formed in the joint flange portion 12A and the air vent bead 20 formed in the joint flange portion 12B are configured to be symmetrical in the panel width direction of the first panel 10. For this reason, in the following description, the air vent bead 20 formed in the joint flange portion 12A will be described, and description of the air vent bead 20 formed in the joint flange portion 12B will be omitted.

Figure 2B:
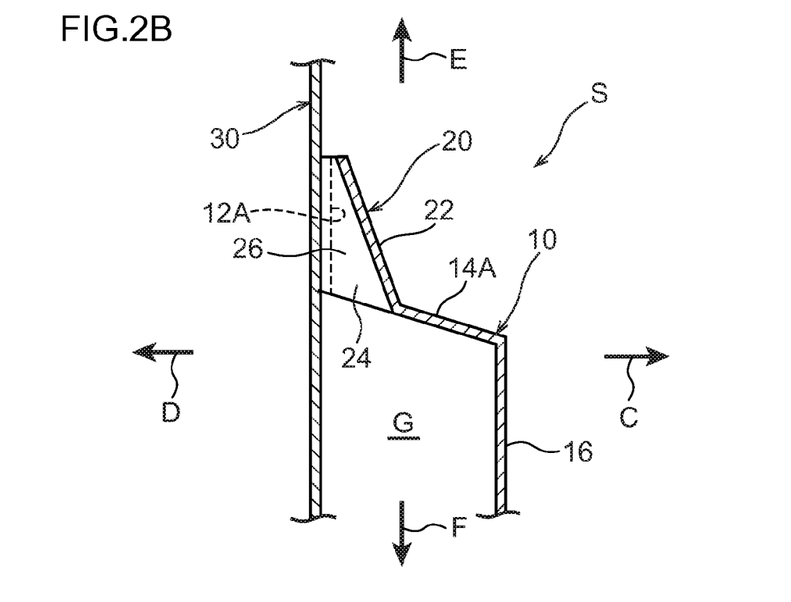
FIG. 2B is an enlarged cross-sectional view (a cross-sectional view along line 2B-2B of FIG. 1) showing an air vent bead shown in FIG. 1 as seen from the one side in the lengthwise direction of the first panel.

The air vent bead 20 is formed in a region of the joint flange portion 12A between a pair of the joint portions 18A adjacent to one another in the lengthwise direction of the first panel 10. Furthermore, the air vent bead 20 is plurally formed in the joint flange portion 12A (FIG. 1 shows one air vent bead 20 for the sake of convenience) and is disposed every predetermined interval in the lengthwise direction of the first panel 10. The air vent bead 20 projects toward the one side in the plate thickness direction of the joint flange portion 12A (in the direction away from the second panel 30) and extends from the distal end to the base end of the joint flange portion 12A. Specifically, the air vent bead 20 extends in the orthogonal direction as seen from the plate thickness direction of the joint flange portion 12A. For this reason, in a state before the sealer 42 is applied to the distal end portion of the joint flange portion 12A, an air vent hole 26 formed by the air vent bead 20 and the second panel 30 runs along the orthogonal direction. Additionally, as shown in FIG. 2B, the base end side of the air vent hole 26 is communicated with the space G between the first panel 10 and the second panel 30, and in a state before the sealer 42 is applied to the distal end portion of the joint flange portion 12A, the distal end side of the air vent hole 26 opens to one side in the orthogonal direction (the side in the direction of arrow E in FIG. 2B). In FIG. 2B, illustration of the sealer 42 is omitted for the sake of convenience.

Figure 3A:
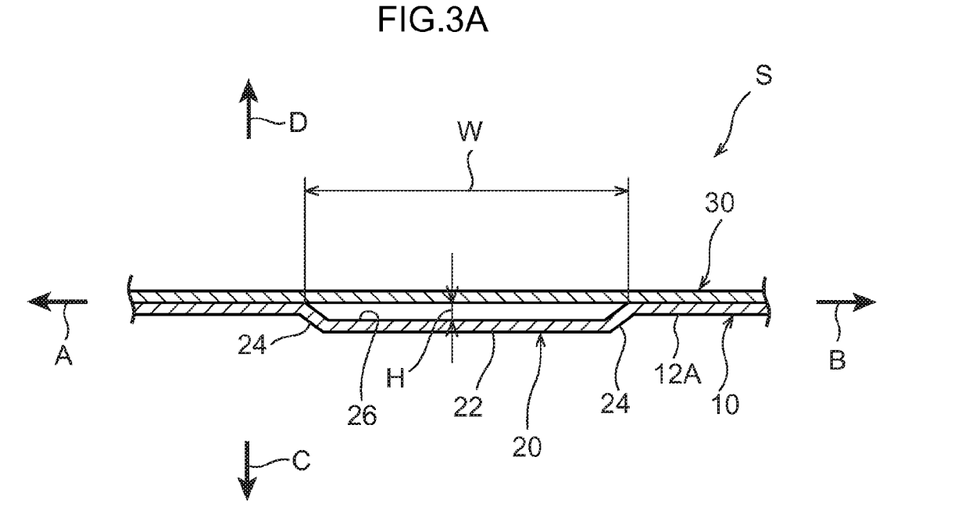
FIG. 3A is an enlarged cross-sectional view (a cross-sectional view along line 3A-3A of FIG. 1) showing a distal end section of the air vent bead shown in FIG. 1 as seen from a distal end side of the joint flange portion.
Figure 3B:
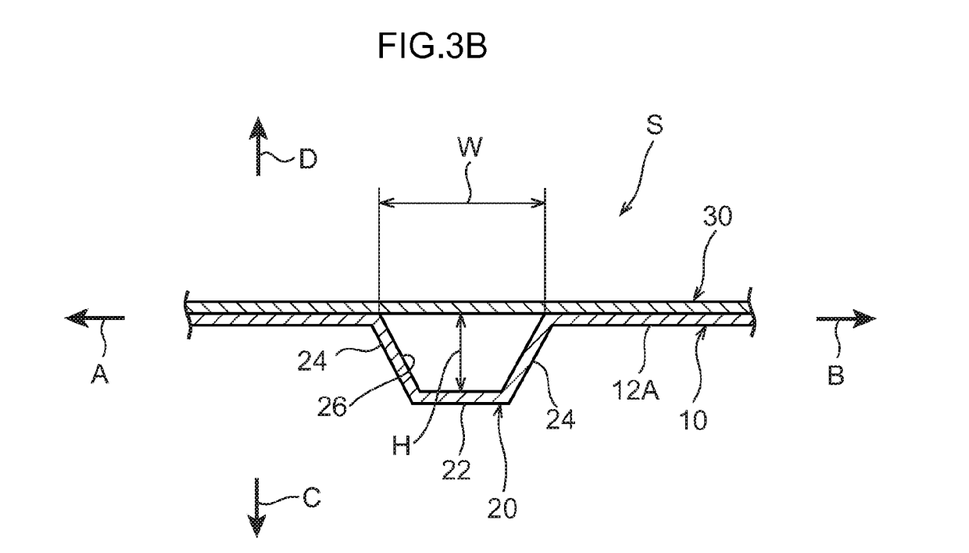
FIG. 3B is an enlarged cross-sectional view (a cross-sectional view along line 3B-3B of FIG. 1) showing a base end section of the air vent bead shown in FIG. 1 as seen from the distal end side of the joint flange portion.

Furthermore, as shown in FIG. 3A and FIG. 3B, the air vent bead 20 is formed in a substantially recessed shape that opens to the other side in the plate thickness direction of the joint flange portion 12A as seen in a cross-sectional view seen from the one side in the orthogonal direction (which corresponds to the distal end side of the air vent bead 20 of the present invention). Specifically, the air vent bead 20 is configured to include a bead bottom wall portion 22, which serves as a "bottom wall portion" and is disposed parallel to the second panel 30 as seen in a cross-sectional view seen from the one side in the orthogonal direction, and bead side wall portions 24, which serve as a pair of "side wall portions" and interconnect both width direction (the direction of arrow A and the direction of arrow B in FIG. 3A and FIG. 3B) ends of the bead bottom wall portion 22 and the joint flange portion 12A. Because of this, as seen in a cross-sectional view seen from the one side in the orthogonal direction, the air vent hole 26 is formed in a substantially trapezoidal shape and the distance from the second panel 30 to the bead bottom wall portion 22 is set constant.

Moreover, as shown in FIG. 2B, the bead bottom wall portion 22 slopes in a direction away from the second panel 30 (toward the one side in the plate thickness direction of the joint flange portion 12A) heading toward the base end side of the air vent bead 20 as seen from the lengthwise direction of the first panel 10. Because of this, as shown in FIG. 3A and FIG. 3B, a height dimension H in the height direction (the direction of arrow C and the direction of arrow D in FIG. 3A and FIG. 3B) of the air vent bead 20 is set so as to be larger on the base end side of the air vent bead 20 than on the distal end side of the air vent bead 20. Additionally, the height dimension H at the distal end of the air vent bead 20 is set to a dimension in which the open portion of the air vent hole 26 can be sealed by the sealer 42.

Furthermore, as shown in FIG. 1, as seen from the plate thickness direction of the joint flange portion 12A, the width dimension of the air vent bead 20 at the bead bottom wall portion 22 is set so as to become larger heading toward the distal end side of the air vent bead 20. In other words, the bead side wall portions 24 slope in directions away from one another heading toward the distal end side of the air vent bead 20. Because of this, as shown in FIG. 3A and FIG. 3B, a width dimension W of the air vent bead 20 (the air vent hole 26) is set so as to be larger on the distal end side of the air vent bead 20 than on the base end side of the air vent bead 20.

Next, the action and effects of the present embodiment will be described.

In the panel joint structure S configured as described above, the second panel 30 is disposed opposing the joint flange portions 12A and 12B of the first panel 10 and is joined at the joint portions 18A and 18B of the joint flange portions 12A and 12B. Furthermore, the air vent beads 20 are formed in the joint flange portions 12A and 12B, and the air vent beads 20 project in the direction away from the second panel 30 and extend from the distal ends to the base ends of the joint flange portions 12A and 12B. Because of this, the air vent holes 26 running in the orthogonal direction are formed by the air vent beads 20 and the second panel 30, and the base end sides of the air vent holes 26 are communicated with the space G between the first panel 10 and the second panel 30. For this reason, when electrodeposition coating the first panel 10 and the second panel 30 in a state in which they have been joined to one another, the air inside the space G between the first panel 10 and the second panel 30 flows from the base end sides of the air vent holes 26 into the air vent holes 26 and is expelled from the distal end sides of the air vent holes 26. Because of this, during electrodeposition coating, the air inside the space G between the first panel 10 and the second panel 30 can be vented from the air vent holes 26.

Here, the air vent beads 20 slope in the direction away from the second panel 30 heading toward the base end sides of the joint flange portions 12A and 12B as seen from the lengthwise direction of the first panel 10. For this reason, the height dimension H of the base end portions of the air vent beads 20 is set so as to be larger than the height dimension H of the distal end portions of the air vent beads 20. Because of this, the distance between the distal ends of the air vent beads 20 and the second panel 30 can be kept from increasing. Consequently, the gaps between the second panel 30 and the distal end portions of the joint flange portions 12A and 12B including the air vent beads 20 can be excellently sealed by the sealer 42.

As mentioned above, the height dimension H of the base end portions of the air vent beads 20 is set so as to be larger than the height dimension H of the distal end portions of the air vent beads 20. Because of this, the width dimension W of the air vent beads 20 can be kept from becoming larger and the cross-sectional area on the base end sides of the air vent holes 26 can be enlarged. That is, the joint lengths of the joint portions 18A and 18B can be ensured and the cross-sectional area on the base end sides of the air vent holes 26 can be enlarged. As a result, when electrodeposition coating the first panel 10 and the second panel 30, the air inside the space G between the first panel 10 and the second panel 30 can be excellently caused to flow into the air vent holes 26. Consequently, the joint strength at the joint portions 18A and 18B can be ensured and the air venting effect resulting from the air vent holes 26 during electrodeposition coating can be enhanced. Thus, sealedness and joint strength between the first panel 10 and the second panel 30 can be ensured and the air venting effect resulting from the air vent holes 26 can be enhanced.

Moreover, the width dimension W of the air vent beads 20 as seen from the plate thickness direction of the joint flange portions 12A and 12B is set so as to be larger at the distal ends of the air vent beads 20 than at the base ends of the air vent beads 20. For this reason, the distance between the air vent beads 20 and the second panel 30 at the distal ends of the air vent beads 20 can be set to a distance that can be sealed by the sealer 42 and the cross-sectional area on the distal end sides of the air vent holes 26 can be enlarged. Because of this, the air inside the space G between the first panel 10 and the second panel 30 can be excellently expelled from the air vent holes 26. Consequently, the air venting effect resulting from the air vent holes 26 when electrodeposition coating the first panel 10 and the second panel 30 can be enhanced even more.

Moreover, the air vent beads 20 are each configured to include the pair of bead side wall portions 24 and the bead bottom wall portion 22, and the bead bottom wall portion 22 is disposed parallel to the second panel 30 as seen in a cross-sectional view seen from the one side in the orthogonal direction. For this reason, the distance between the bead bottom wall portion 22 and the second panel 30 can be set constant in the width direction of the air vent bead 20 as seen in a cross-sectional view seen from the one side in the orthogonal direction. Because of this, the sealer 42 can be excellently applied to the distal end portions of the air vent beads 20. Consequently, workability when applying the sealer 42 to the distal end portions of the joint flange portions 12A and 12B (the air vent beads 20) can be improved and the sealedness resulting from the sealer 42 can be improved. Furthermore, the air vent beads 20 can be given a configuration in which the distance between the bead bottom wall portions 22 and the second panel 30 at the distal ends of the air vent beads 20 can be easily managed.

Furthermore, the panel joint structure S of the present embodiment is applied to the joint sections between the first panel 10 and the second panel 30 that configure the lower portion of a vehicle (automobile). For this reason, electrodeposition coating can be excellently performed with respect to the first panel 10 and the second panel 30 that configure the lower portion of a vehicle, which easily becomes wet with liquid such as water.

Figure 4A:
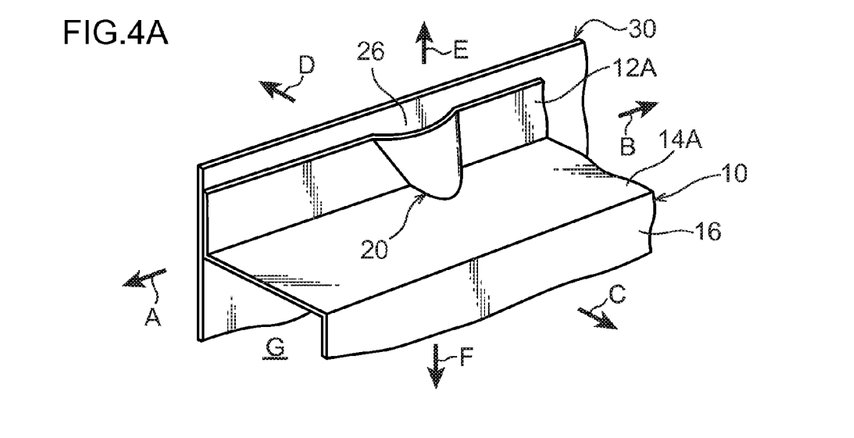
FIG. 4A is a schematic perspective view showing an example modification of the air vent bead shown in FIG. 1.

In the present embodiment, the air vent bead 20 is formed in a substantially recessed shape that opens toward the other side in the plate thickness direction of the joint flange portion 12A as seen in a cross-sectional view seen from one side in the orthogonal direction, but the cross-sectional shape of the air vent bead 20 is not limited to this. For example, as shown in FIG. 4A, the air vent bead 20 may also be formed in a curved shape (a substantially circular arc shape) that becomes convex toward the one side in the plate thickness direction of the joint flange portion 12A as seen from the one side in the orthogonal direction. Because of this, the air vent bead 20 can be given a shape that is easy to form. Consequently, the formability of the first panel 10 can be improved.

Figure 4B:
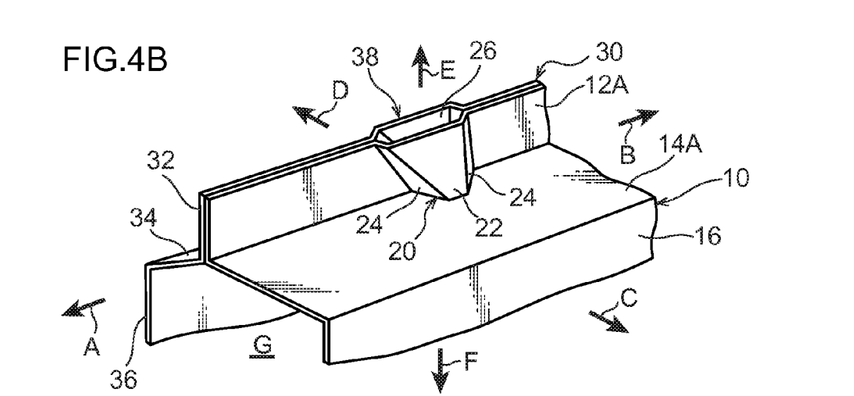
FIG. 4B is a schematic perspective view showing an example modification of the second panel shown in FIG. 1.

Furthermore, in the present embodiment, the second panel 30 is formed in a flat plate shape, but the shape of the second panel 30 is not limited to this. For example, the second panel 30 may also be formed in a cross-sectionally substantially hat shape like the first panel 10. That is, as shown in FIG. 4B, the second panel 30 may also be configured to include a joint counterpart flange portion 32 that is disposed opposing the joint flange portion 12A of the first panel 10 in the plate thickness direction, a panel side wall portion 34 that extends from the base end of the joint counterpart flange portion 32 toward the other side in the plate thickness direction of the joint flange portion 12A, and a panel bottom wall portion 36 that is disposed substantially parallel to the panel bottom wall portion 16 of the first panel 10.

Moreover, in this case also, an air vent bead 38 serving as a "second panel bead portion" may also be formed in the joint counterpart flange portion 32. Specifically, the air vent bead 38 may be formed in the region of the joint counterpart flange portion 32 opposing the air vent bead 20 of the first panel 10 so that the air vent bead 38 is configured to be symmetrical with the air vent bead 20 in the plate thickness direction of the joint flange portion 12A. As a result, the air vent hole 26 is formed by the air vent bead 20 and the air vent bead 38. For this reason, the cross-sectional area of the air vent hole 26 can be enlarged compared to a case where the air vent bead 38 is not disposed in the joint counterpart flange portion 32. Because of this, even when the overall width dimension W of the air vent bead 20 and the air vent bead 38 (the width dimension of the air vent hole 26) is set small, the cross-sectional area of the air vent hole 26 can be ensured. Consequently, in this case, the joint lengths of the joint portions 18A and 18B become longer, so the joint strength at the joint portions 18A and 18B can be enhanced even more.

Figure 4C:
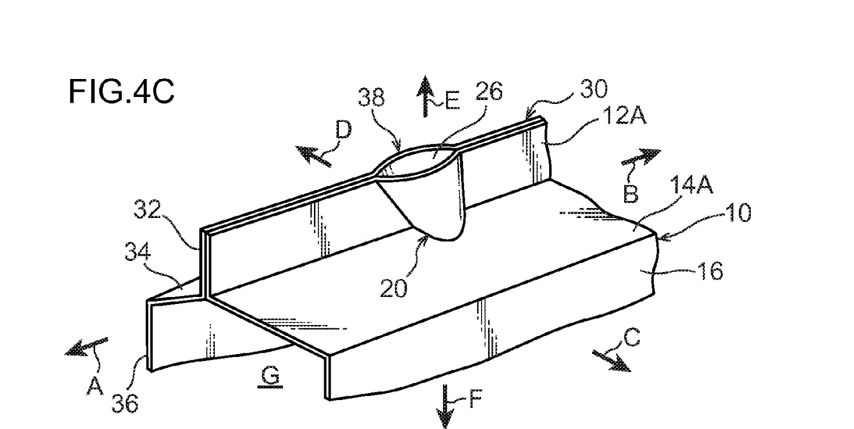
FIG. 4C is a schematic perspective view showing an example modification of the air vent bead shown in FIG. 4B.

Moreover, as shown in FIG. 4C, in a case where the air vent bead 38 is formed in the joint counterpart flange portion 32, the cross-sectional shape of the air vent bead 38 may also be formed in a curved shape that becomes convex toward the other side in the plate thickness direction of the joint flange portion 12A, for example, like the aforementioned example modification of the air vent bead 20 shown in FIG. 4A.

Furthermore, in the present embodiment, as mentioned above, the width dimension W of the air vent bead 20 is set so as to become larger heading from the base end side toward the distal end side of the air vent bead 20, and the height dimension H of the air vent bead 20 is set so as to become larger heading from the distal end side toward the base end side of the air vent bead 20. Instead of this, one of the width dimension W and the height dimension H of the air vent bead 20 may also be set so as to be the same on the distal end side and the base end side of the air vent bead 20. That is, for example, the height dimension H of the air vent bead 20 may be set so as to become larger heading from the distal end side toward the base end side of the air vent bead 20 while the width dimension W of the distal end of the air vent bead 20 is set to the same dimension as the width dimension W of the base end of the air vent bead 20. In this case also, the joint lengths at the joint portions 18A and 18B can be ensured and the cross-sectional area on the base end side of the air vent holes 26 can be enlarged. Because of this, the air inside the space G between the first panel 10 and the second panel 30 can be excellently caused to flow into the air vent holes 26 during electrodeposition coating. Consequently, the joint strength at the joint portions 18A and 18B and the sealedness resulting from the sealer 42 can be ensured and the air venting effect resulting from the air vent holes 26 during electrodeposition coating can be enhanced.

Furthermore, for example, the width dimension W of the air vent bead 20 may be set so as to become larger heading from the base end side toward the distal end side of the air vent bead 20 while the height dimension H on the base end side of the air vent bead 20 is set to the same dimension as the height dimension H on the distal end side of the air vent bead 20. In this case, the distance between the air vent bead 20 and the second panel 30 at the distal end of the air vent bead 20 can be set to a distance that can be sealed by the sealer 42 and the cross-sectional area on the distal end side of the air vent hole 26 can be enlarged. Because of this, the joint lengths of the joint portions 18A and 18B can be ensured and the cross-sectional area on the distal end sides of the air vent holes 26 can be enlarged. Consequently, in this case also, the joint strength at the joint portions 18A and 18B and the sealedness resulting from the sealer 42 can be ensured and the air venting effect resulting from the air vent holes 26 can be enhanced.

Furthermore, in the present embodiment, the air vent bead 20 is formed in each of the joint flange portions 12A and 12B on both panel width direction end portions of the first panel 10, but the air vent bead 20 may also be formed in just one of the joint flange portion 12A and the joint flange portion 12B, for example, in appropriate correspondence to the posture of the first panel 10 and the second panel 30 during electrodeposition coating. Because of this, either one of the joint flange portions 12A and 12B is the "one end portion as seen from the lengthwise direction of the first panel 10" in the present invention.

Furthermore, in the present embodiment, the first panel 10 and the second panel 30 are joined to one another by laser welding, but spot welding may also be used as means for joining the first panel 10 and the second panel 30 to one another. For example, as indicated by the dashed "X" marks in FIG. 1, the first panel 10 and the second panel 30 may also be joined to one another by spot welding at regions between the distal ends and the base ends of the joint flange portions 12A and 12B.

What is claimed is:

1. A panel joint structure comprising:
    a first panel that is formed in an elongated shape, the first panel having a joint flange portion formed in at least one end portion of the first panel as seen in a lengthwise direction of the first panel;
    a second panel that is disposed opposing the joint flange portion in a thickness direction of the joint flange portion, the second panel being joined to the joint flange portion, and a space being formed between the second panel and the first panel;
    a joint portion that is formed by a section of the joint flange portion joined to the second panel, the joint portion being formed along the lengthwise direction of the first panel;
    a seal member that seals a gap between a distal end portion of the joint flange portion and the second panel, as seen in the lengthwise direction of the first panel; and
    a first panel bead portion that is formed in the joint flange portion, the first panel bead portion being adjacent to the joint portion as seen in the lengthwise direction of the first panel, the first panel bead portion projecting in a direction away from the second panel in the thickness direction of the joint flange portion, the first panel bead portion extending from a distal end of the joint flange portion to a base end of the joint flange portion, and the first panel bead portion and the second panel forming an air vent hole therebetween communicating with the space between the first panel and the second panel, wherein:
    the first panel bead portion slopes in a direction away from the second panel as the first panel bead portion extends from the distal end of the joint flange portion towards the base end of the joint flange portion as seen from the lengthwise direction of the first panel; or
    a width dimension of the first panel bead portion, as seen from the thickness direction of the joint flange portion, is set to be larger at the distal end of the joint flange portion than at the base end of the joint flange portion.

2. The panel joint structure of claim 1, wherein:
    the first panel bead portion includes: (i) a pair of side wall portions, the pair of side wall portions configure both width direction end portions of the first panel bead portion, and (ii) a bottom wall portion that couples the pair of side wall portions to one another, and
    the bottom wall portion is disposed parallel to the second panel as seen in a cross-sectional view seen from a distal end side of the joint flange portion.

3. The panel joint structure of claim 1, wherein the first panel bead portion is curved so as to become convex in a direction away from the second panel as seen in a cross-sectional view seen from a distal end side of the joint flange portion.

4. The panel joint structure of claim 1, wherein:
    a joint counterpart flange portion that is disposed opposing the joint flange portion, the joint counterpart flange portion being joined to the joint flange portion, and the joint counterpart flange portion being formed in the second panel,
    a second panel bead portion that projects in a direction away from the first panel, the second panel bead portion being formed in the joint counterpart flange portion, and
    the air vent hole is formed by the first panel bead portion and the second panel bead portion.

5. The panel joint structure of claim 1, wherein:
    the first panel is a skeletal member that extends in a front and rear direction or a vehicle width direction of a vehicle, and
    the second panel is a member that configures a lower portion of the vehicle.

\* \* \* \* \*